(12) United States Patent
Koo et al.

(10) Patent No.: US 10,199,629 B2
(45) Date of Patent: Feb. 5, 2019

(54) SECONDARY BATTERY WITH TERMINAL PIN

(71) Applicant: SAMSUNG SDI CO., LTD., Yongin-si, Gyeonggi-do (KR)

(72) Inventors: Minseok Koo, Yongin-si (KR); Hyunyoung Lim, Yongin-si (KR); Hyunsoo Lee, Yongin-si (KR); Janghyun Song, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 81 days.

(21) Appl. No.: 15/180,367

(22) Filed: Jun. 13, 2016

(65) Prior Publication Data

US 2017/0149043 A1    May 25, 2017

(30) Foreign Application Priority Data

Nov. 24, 2015 (KR) ........................ 10-2015-0164900

(51) Int. Cl.
| | |
|---|---|
| *H01M 2/02* | (2006.01) |
| *H01M 6/08* | (2006.01) |
| *H01M 2/08* | (2006.01) |
| *H01M 2/30* | (2006.01) |
| *H01M 2/06* | (2006.01) |

(52) U.S. Cl.
CPC ............. *H01M 2/30* (2013.01); *H01M 2/02* (2013.01); *H01M 2/06* (2013.01); *H01M 2/08* (2013.01)

(58) Field of Classification Search
None
See application file for complete search history.

(56) References Cited

U.S. PATENT DOCUMENTS

| | | | | |
|---|---|---|---|---|
| 5,585,207 | A * | 12/1996 | Wakabe | ............... H01M 2/06 |
| | | | | 429/178 |
| 2002/0022409 | A1* | 2/2002 | Caridei | ............... H01M 2/307 |
| | | | | 439/764 |
| 2011/0244309 | A1 | 10/2011 | Byun et al. | |
| 2012/0040240 | A1* | 2/2012 | Kim | ............... H01M 2/0473 |
| | | | | 429/175 |
| 2012/0156548 | A1 | 6/2012 | Kim | |
| 2012/0189908 | A1* | 7/2012 | Tsutsumi | ............... H01G 9/016 |
| | | | | 429/179 |
| 2016/0043377 | A1* | 2/2016 | Heid | ............... H01M 2/06 |
| | | | | 429/175 |

FOREIGN PATENT DOCUMENTS

| | | |
|---|---|---|
| JP | 2008-305646 A | 12/2008 |
| KR | 10-2011-0109779 A | 10/2011 |
| KR | 10-2011-0109843 A | 10/2011 |
| KR | 10-2012-0073748 A | 7/2012 |

* cited by examiner

*Primary Examiner* — Olatunji A Godo
*Assistant Examiner* — Julian Anthony
(74) *Attorney, Agent, or Firm* — Lee & Morse, P.C.

(57) ABSTRACT

A secondary battery, including an electrode assembly; a case accommodating the electrode assembly; a cap plate sealing the case; at least one electrode terminal including a terminal plate on the cap plate and a terminal pin passing through the cap plate and the terminal plate and electrically connected to the electrode assembly; and at least one groove on a top surface of the terminal plate; a top portion of the terminal pin is bent for insertion into the at least one groove.

9 Claims, 5 Drawing Sheets

SECONDARY BATTERY WITH TERMINAL PIN

CROSS-REFERENCE TO RELATED APPLICATION

Korean Patent Application No. 10-2015-0164900 filed on Nov. 24, 2015 in the Korean Intellectual Property Office, and entitled: "Secondary Battery," is incorporated by reference herein in its entirety.

BACKGROUND

1. Field

Embodiments relate to a secondary battery.

2. Description of the Related Art

A secondary rechargeable battery may be a battery that may be repeatedly charged and discharged, unlike a primary battery. A small-capacity rechargeable battery may be used for small portable electronic devices such as, for example, mobile phones or camcorders, and a large-capacity secondary battery may be used as a motor-driving power source, such as in, for example, a hybrid vehicle.

SUMMARY

Embodiments may be realized by providing a secondary battery, including an electrode assembly; a case accommodating the electrode assembly; a cap plate sealing the case; at least one electrode terminal including a terminal plate on the cap plate and a terminal pin passing through the cap plate and the terminal plate and electrically connected to the electrode assembly; and at least one groove on a top surface of the terminal plate; a top portion of the terminal pin is bent for insertion into the at least one groove.

The terminal plate may include a through-hole into which a top portion of the terminal pin is inserted to pass therethrough, a first groove along a peripheral portion of the through-hole on a top surface of the terminal plate, and a second groove on a bottom surface of the first groove and spaced apart from the through-hole.

The through-hole may range from the center of the bottom surface of the first groove to a bottom surface of the terminal plate.

The second groove may be perpendicular to the terminal plate.

The second groove may be parallel with the through-hole.

The second groove may be along the peripheral portion of the through-hole and may be spaced apart from the through-hole.

The top portion of the terminal pin may be within the first groove and may include a first extension part bent and extending from a top portion of the through-hole to an interior surface of the first groove, and a second extension part bent and extending from an end of the first extension part and inserted into the second groove.

The first extension part may be along the bottom surface of the first groove and may be parallel with the terminal plate, and the second extension part may be bent and may extend from the end of the first extension part and may be perpendicular to the terminal plate.

The first extension part may be along the bottom surface of the first groove and may be parallel with the terminal plate, and the second extension part may be bent and may extend from the end of the first extension part and may be parallel with the terminal plate.

The terminal pin and the terminal plate may include dissimilar metals.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
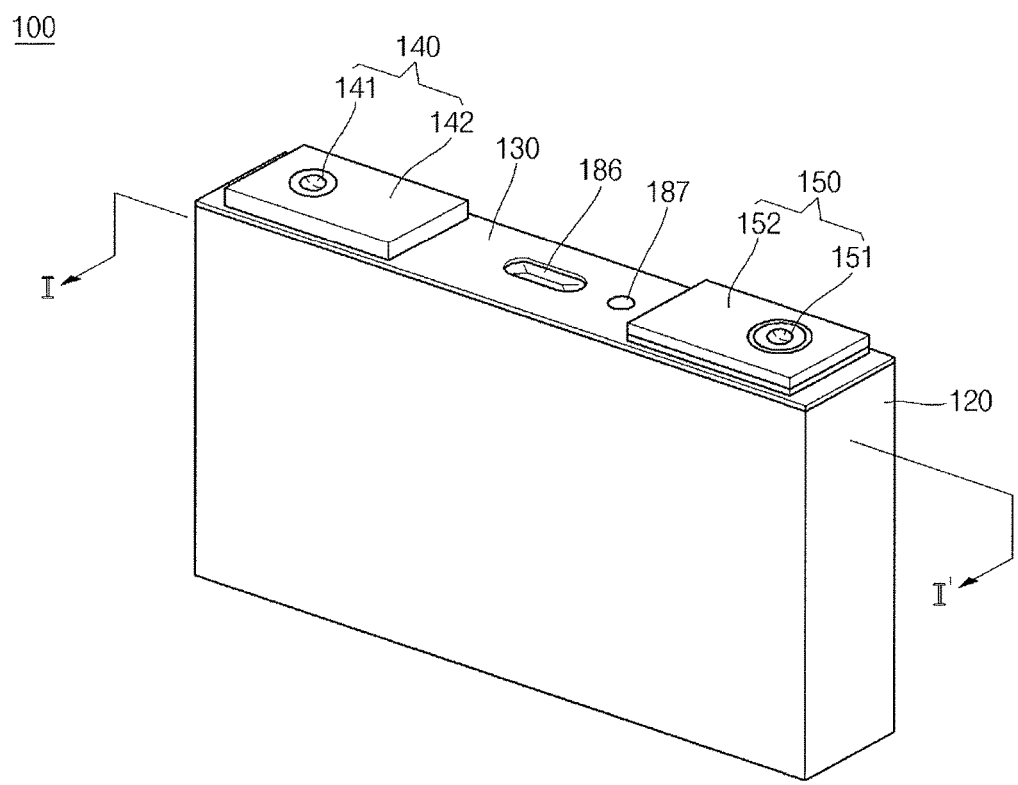
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
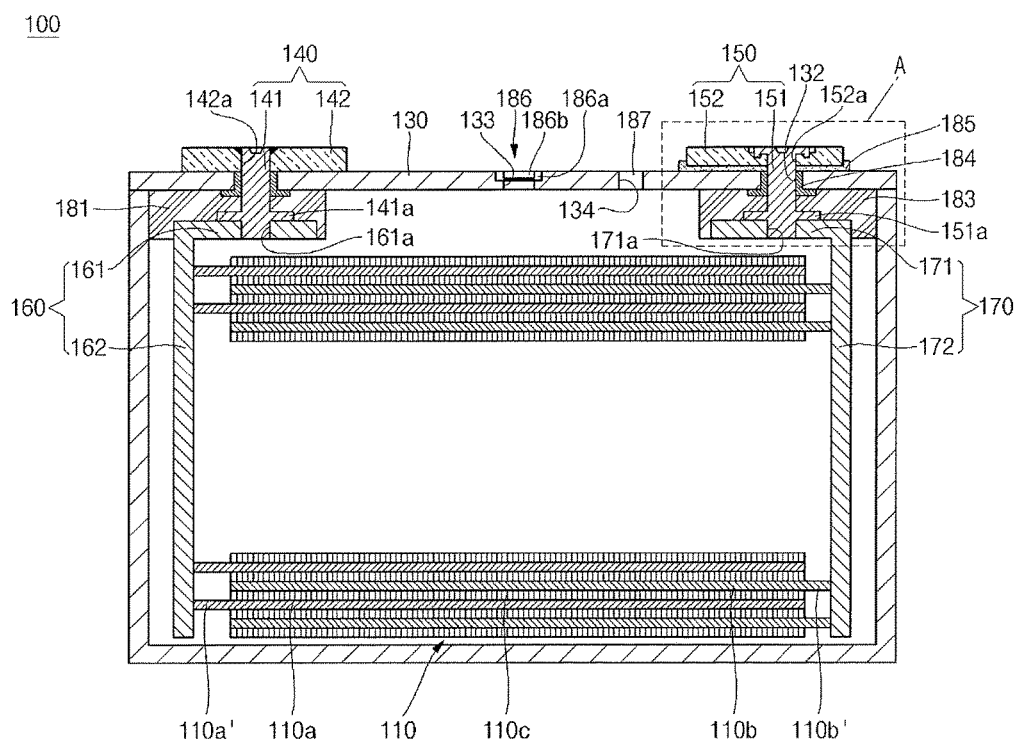
FIG. 2 illustrates a cross-sectional view of the secondary battery illustrated in FIG. 1, taken along the line I-I'.

FIG. 1 illustrates a perspective view of a secondary battery according to an embodiment and FIG. 2 illustrates a cross-sectional view of the secondary battery illustrated in FIG. 1, taken along the line I-I'.

Referring to FIGS. 1 and 2, the secondary battery 100 according to an embodiment may include an electrode assembly 110, a case 120, a cap plate 130, a first electrode terminal 140, and a second electrode terminal 150. The secondary battery 100 may further include a first electrode current collector 160, a second electrode current collector 170, a first lower insulation member 181, a first gasket 182, a second lower insulation member 183, a second gasket 184, an upper insulation member 185, a safety vent 186, and a plug 187.

The first electrode plate 110*a* may be formed by coating a first electrode active material, such as a transition metal oxide, on a first electrode current collector made of a metal foil, such as an aluminum foil, and may include a first electrode uncoated portion 110*a*'on which the first electrode active material is not coated. The first electrode uncoated portion 110*a*' may become a path of current flowing between the first electrode plate 110*a* and the outside of the first electrode plate 110*a*.

The second electrode plate 110*b* may be formed by coating a second electrode active material, such as graphite or carbon, on a second electrode collector made of a metal foil, such as a copper or nickel foil, and may include a second electrode uncoated portion 110*b*' on which the second electrode active material is not coated. The second electrode uncoated portion 110*b*' may become a path of current flowing between the second electrode plate 110*b* and the outside of the second electrode plate 110*b*.

Polarities of the first electrode plate 110a and the second electrode plate 110b may be reversed. The first electrode plate 110a may function as a negative electrode and the second electrode plate 110' may function as a positive electrode.

The separator 110c, which may be positioned between the first and second electrodes 110a and 110b, may prevent or may substantially prevent an electrical short-circuit therebetween and may allow movement of lithium ions. The separator 110c may be made of polyethylene, polypropylene, or a composite film of polyethylene and polypropylene.

A first electrode current collector 160 and a second electrode current collector 170 may be coupled to opposite ends of the electrode assembly 110 to be electrically connected to the first electrode plate 110a and the second electrode plate 110b, respectively.

The case 120 may be made of a conductive metal, such as aluminum, an aluminum alloy, or nickel, and the electrode assembly 110, the first electrode current collector 160, and the second electrode current collector 170 may be inserted and placed therein. The case 120 and the cap plate 130 assembled with each other are illustrated in FIG. 2, and an opening of the case is not shown. The opening may correspond to a substantially opened top periphery of the case 120. Inner surfaces of the case 120 and the cap plate 130 may be subjected to insulation treatment to be insulated from the electrode assembly 110, the first electrode current collector 160, and the second electrode current collector 170. The case 120 and the cap plate 130 may have a polarity. For example, the case 120 and the cap plate 130 may function as a positive electrode.

The cap plate 130 may seal the opening of the case 120 and may be formed using the same material as the case 120, and the cap plate 130 and the case 120 may have the same polarity.

A first terminal hole 131, a second terminal hole 132, a vent hole 133, and an electrolyte injection hole 134 may be formed in the cap plate 130. The first electrode terminal 140 may pass through the first terminal hole 131. The first terminal pin 141 of the first electrode terminal 140 may pass through the first terminal hole 131. The second electrode terminal 150 may pass through the second terminal hole 132. The second terminal pin 151 of the second electrode terminal 140 may pass through the second terminal hole 132. A vent plate 186a may be installed in the vent hole 133. A notch 186b may be formed in the vent plate 186a so as to be opened at a withstand voltage of the case 120. The electrolyte injection hole 134 may be formed to inject an electrolyte into the case 120 and may be sealed by a plug 187.

The first electrode terminal 140 may include a first terminal pin 141 and a first terminal plate 142.

The first terminal pin 141 may have a substantially cylindrical shape. A middle portion of the first terminal pin 141 may pass through the first terminal hole 131 and a flange 141a may be formed at its lower portion to prevent the first terminal pin 141 from being dislodged from the cap plate 130. A bottom end of the first terminal pin 141, which may correspond to a lower portion of the flange 141a, may be coupled to the first electrode current collector 160, which will later be described in more detail. An upper portion of the first terminal pin 141 may be inserted into and pass through the first through-hole 142a of the first terminal plate 142 and a top end of the first terminal pin 141 may be riveted to prevent the first terminal plate 142 from being dislodged from the cap plate 130. The top end of the first terminal pin 141 may be riveted, and the first terminal pin 141 and the first terminal plate 142 may be coupled to each other.

A first through-hole 142a through which the first terminal pin 141 may pass may be formed in the first terminal plate 142. The first terminal plate 142 may be disposed on the cap plate 130 and the top end of the first terminal pin 141 may be riveted to then be coupled to the first terminal pin 141, and the first terminal plate 142 may be firmly fixed to the first terminal pin 141 so as not to be dislodged from the cap plate 130.

Materials of the first terminal pin 141 and the first terminal plate 142 are not limited to those disclosed herein, and all available, e.g., suitable, metals in the related art may be employed to the first terminal pin 141 and the first terminal plate 142.

The second electrode terminal 150 may include a second terminal pin 151 and a second terminal plate 152.

The second terminal pin 151 may have a substantially cylindrical shape. A middle portion of the second terminal pin 151 may pass through the second terminal hole 132 and a flange 151a may be formed at its lower portion to prevent the second terminal pin 151 from being dislodged from the cap plate 130. A bottom end of the second terminal pin 151, which may correspond to a lower portion of the flange 151a, may be coupled to the second electrode current collector 170, which will later be described in more detail. An upper portion of the second terminal pin 151 may be inserted into and pass through the second through-hole 152a of the second terminal plate 152 and a top end of the second terminal pin 151 may be riveted to prevent the second terminal plate 152 from being dislodged from the cap plate 130. At least one groove may be formed on a top surface of the second terminal plate 152 and the top end of the second terminal pin 151 may be riveted to then be bent at least one time and may be inserted into the groove formed in the second terminal plate 152, and the second terminal pin 151 and the second terminal plate 152 may be coupled to each other.

Hereinafter, configurations, the configurational relationship and coupling mechanism of the second terminal pin 151 and the second terminal plate 152 will now be described in more detail.

Figure 3:
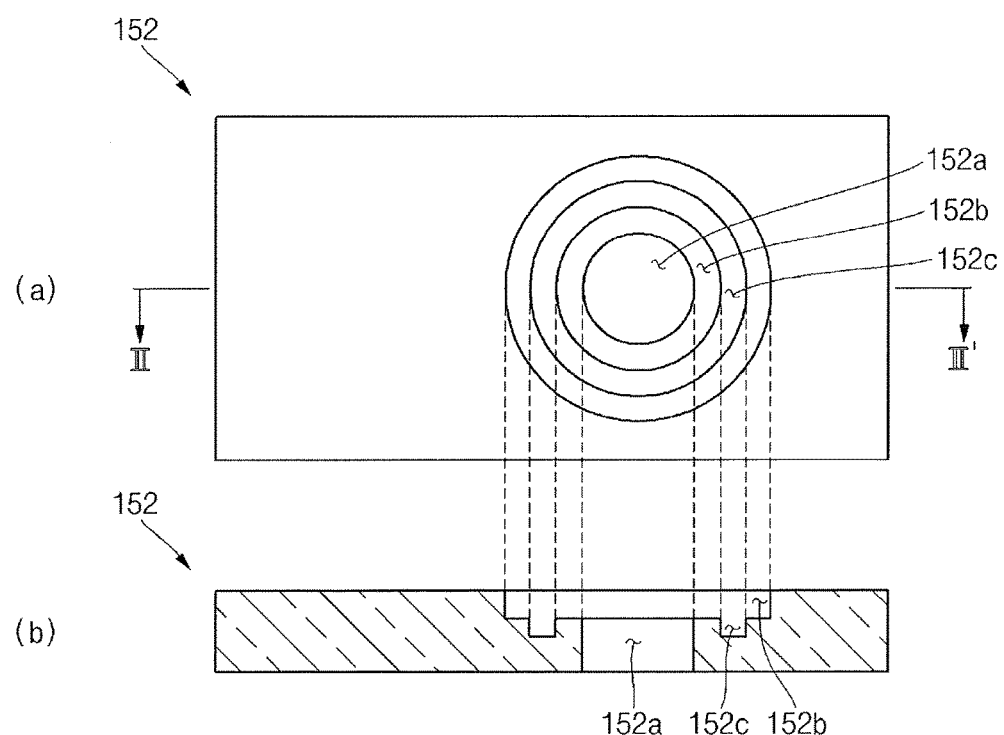
FIG. 3 illustrates a plan view and a cross-sectional view of a second terminal plate according to an embodiment.
Figure 4:
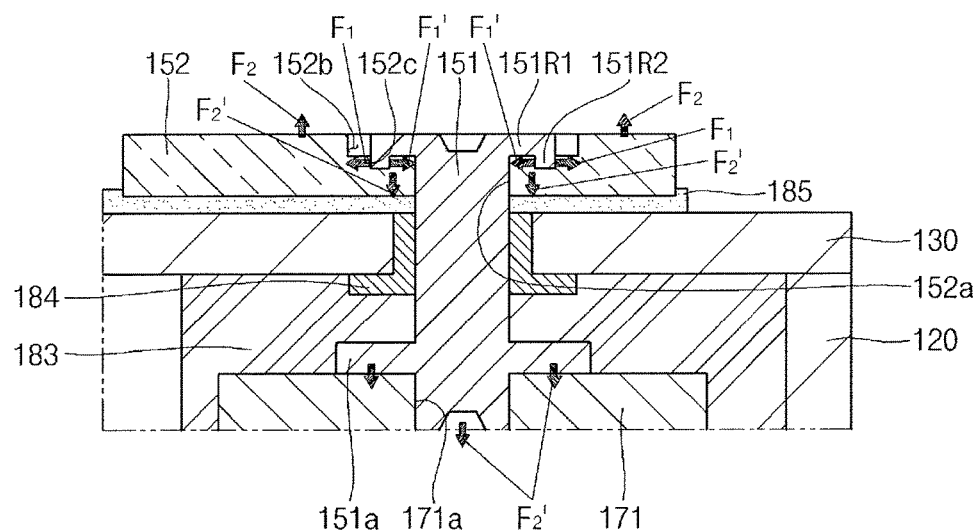
FIG. 4 illustrates an enlarged view of a region 'A' of FIG. 2, of interaction between a second terminal pin and a second terminal plate due to, for example, thermal expansion of a second electrode terminal.
Figure 5:
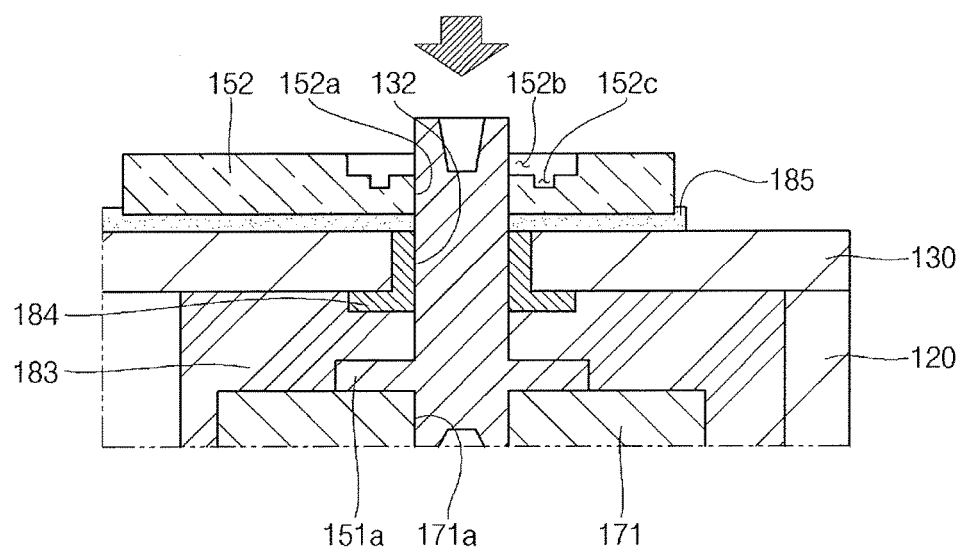
FIGS. 5 and 6 illustrate views of coupling mechanism of a second terminal pin and a second terminal plate according to an embodiment.
Figure 6:
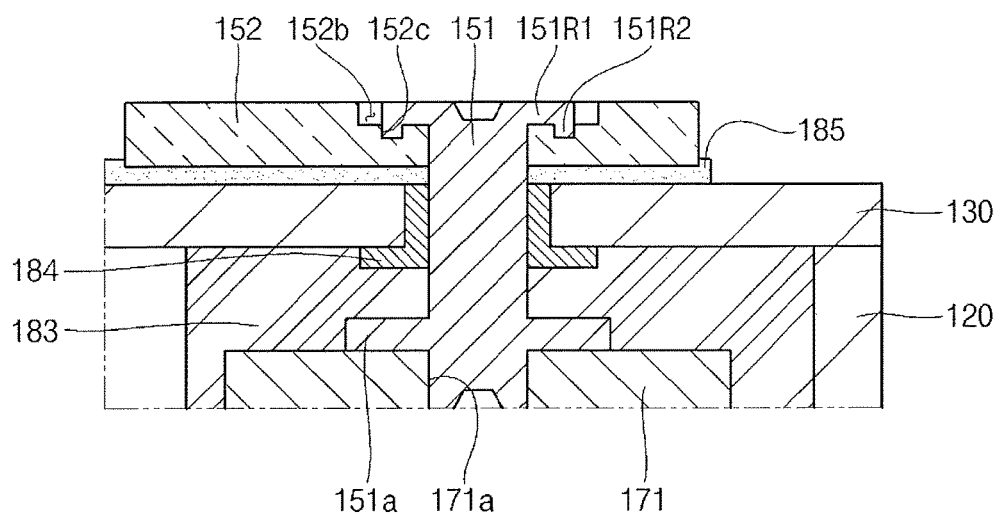

FIG. 3(a) illustrates a plan view of the second terminal plate 152 according to an embodiment and FIG. 3(b) illustrates a cross-sectional view of the second terminal plate 152, taken along the line II-II' of FIG. 3(a). FIG. 4 illustrates an enlarged view of a region 'A' of FIG. 2, of interaction between the second terminal pin 151 and the second terminal plate 152 due to, for example, thermal expansion of the second electrode terminal 150. FIGS. 5 and 6 illustrate views of coupling mechanism of the second terminal pin 151 and the second terminal plate 152 according to an embodiment.

A second through-hole 152a, a first rivet groove 152b and a second rivet groove 152c may be formed in the second terminal plate 152.

The second through-hole 152a may be formed at one side of the second terminal plate 152 and may be formed to range from the center of a bottom surface of the first rivet groove 152b formed on a top surface of the second terminal plate 152 to a bottom surface of the second terminal plate 152. As described above, the top portion of the second terminal pin 151 may be inserted into and pass through the second through-hole 152a.

The first rivet groove 152b may be formed on the top surface of the second terminal plate 152. For example, the first rivet groove 152b may be formed along the peripheral portion of the second through-hole 152a so as to have a predetermined depth from the second through-hole 152a.

The first rivet groove 152b may be formed to have a larger diameter than the second through-hole 152a. The first rivet groove 152b and the second through-hole 152a may be formed to be connected to each other.

As illustrated in FIG. 3(a), the second rivet groove 152c may be formed to have a predetermined depth from the bottom surface of the first rivet groove 152b. The second rivet groove 152c may be formed along the peripheral portion of the second through-hole 152a in a state in which it is spaced apart from the second through-hole 152a, and as illustrated in FIG. 3(a), the second rivet groove 152c may be shaped of a ring surrounding the second through-hole 152a spaced a predetermined distance apart from the second through-hole 152a.

As illustrated in FIG. 3(b), the second rivet groove 152c may be formed to have a predetermined depth from the bottom surface of the first rivet groove 152a so as to be substantially perpendicular to the second terminal plate 152. The second rivet groove 152c may be formed to have a predetermined depth from the bottom surface of the first rivet groove 152a so as to be substantially parallel with the second through-hole 152a. A direction of the depth of the second rivet groove 152c may be substantially perpendicular to the second terminal plate 152 having a substantially planar shape and may be substantially parallel with the second through-hole 152a.

A first extension part 151R1 and a second extension part 151R2 may be formed at a top portion of the second terminal pin 151.

The first extension part 151R1 may be positioned within the first rivet groove and may be bent and extended, e.g., extending, from the top portion of the second terminal pin 151 to an interior surface of the first rivet groove 152b. The first extension part 151R1 may be formed along the bottom surface of the first rivet groove 152b so as to be parallel with the second terminal plate 152. For example, the first extension part 151R1 may be disposed within the first rivet groove 152b in a circular plate shape.

The second extension part 151R2 may be bent and extended from an end of the first extension part 151R1 to then be inserted into the second rivet groove 152c. For example, the second extension part 151R2 may be shaped of a ring inserted into the second rivet groove 152c.

The second extension part 152R2 may be bent and extended from an end of the first extension part 151R1 to then be bent and extended to be perpendicular to the second terminal plate 152. The second extension part 152R2 may be bent and extended from the end of the first extension part 151R1 to then be bent and extended to be parallel with the second through-hole 152a.

The second terminal pin 151 may be made of a metal, such as copper, and the second terminal plate 152 may be made of a metal, such as aluminum. As described above, if the second terminal pin 151 and the second terminal plate 152 are made of dissimilar metals, they may demonstrate different strain factors due to, for example, different coefficients of thermal expansion.

For example, an expansive force may be applied from the second terminal plate 152 in a first direction F1. The first direction F1 may be parallel with the second terminal plate 152. A force may be applied in a second direction F1' opposite to the first direction F1 by the second extension part 151R2 fixedly inserted to be perpendicular to the second terminal plate 152, and the second terminal plate 152 may be held to prevent the second terminal plate 152 from expanding in the first direction F1.

A force may be applied to allow the second terminal plate 152 to expand in a third direction F2. The third direction F2 may be perpendicular to the second terminal plate 152 or may be a lengthwise direction of the second terminal pin 151. A force may be applied in fourth direction F2' opposite to the third direction F2 by the first and second extension parts 151R1 and 151R2 formed on the first terminal pin 151 and the flange 151a formed under the first terminal pin 151, and the second terminal plate 152 may be held to prevent the second terminal plate 152 from expanding in the direction F2.

As described above, the first and second extension parts 151R1 and 151R2 of the first terminal pin 151 may be bent and extended to then be fixedly inserted into the first and second rivet grooves 152b and 152c formed in the second terminal plate 152, and the second electrode terminal 150 may be prevented from being deformed due to, for example, thermal expansion of dissimilar metals.

As illustrated in FIGS. 5 and 6, top portions of the second terminal pin 151 may be riveted, and the first and second extension parts 151R1 and 151R2 may be inserted into first and second rivet grooves 152b and 152c of the second terminal plate 152 to then be bent.

The first electrode current collector 160 may electrically connect the first electrode terminal 140 and the first electrode plate 110a of the electrode assembly 110.

The first electrode current collector 160 may include a first connection part 161 and a second connection part 162. A first coupling hole 161a may be formed in the first connection part 161. A bottom end of the first electrode pin 141 may be inserted into the first coupling hole 161a to then be riveted, and the first connection part 161 and the first electrode pin 141 may be electrically connected to each other. The second connection part 162 may be configured such that it is bent from one end of the first connection part 161 in a substantially vertical direction to then be extended, and may be welded to the first electrode uncoated portion 110a' to then be electrically connected to the first electrode plate 110a.

The second electrode current collector 170 may electrically connect the second electrode terminal 150 and the second electrode plate 110b of the electrode assembly 110.

The second electrode current collector 170 may include a third connection part 171 and a fourth connection part 172. A second coupling hole 171a may be formed in the third connection part 171. A bottom end of the second electrode pin 151 may be inserted into the second coupling hole 171a to then be riveted, and the third connection part 171 and the second electrode pin 151 may be electrically connected to each other. The fourth connection part 172 may be configured such that it is bent from one end of the third connection part 171 in a substantially vertical direction to then be extended, and may be welded to the second electrode uncoated portion 110b' to then be electrically connected to the second electrode plate 110b.

The first lower insulation member 181 may be formed between the first electrode current collector 160 and the cap plate 130 and between the cap plate 130 and the case 120, and unnecessary electrical short circuits therebetween may be prevented.

The first gasket 182 may be inserted into the first terminal hole 142a to seal the first terminal hole 142a formed in the cap plate 130. The first terminal pin 141 may be inserted into the first gasket 182.

The second lower insulation member 183 may be formed between the second electrode current collector 170 and the cap plate 130 and between the cap plate 130 and the case 120, and unnecessary electrical short circuits therebetween may be prevented.

The second gasket 184 may be inserted into the second terminal hole 152a to seal the second terminal hole 152a formed in the cap plate 130. The second terminal pin 151 may be inserted into the second gasket 184.

The upper insulation member 185 may be positioned between the cap plate 130 and the second terminal plate 152, and the cap plate 130 and the second terminal plate 152 may be insulated from each other.

According to an embodiment, the first and second extension parts 151R1 and 151R2 of the first terminal pin 151 may be bent and extended by riveting to then be fixedly inserted into the first and second rivet grooves 152b and 152c formed in the second terminal plate 152, and the second electrode terminal 150 may be prevented from being deformed due to, for example, thermal expansion of dissimilar metals.

Welding of the first terminal pin 151 and the second terminal plate 152 may not be performed, and even if the welding is not performed, the same welding strength may be maintained.

By way of summation and review, high output secondary batteries using non-aqueous electrolytes with high energy density may be high power rechargeable batteries that may be used for devices requiring large-capacity power, for example, to drive motors for electric vehicles.

The secondary battery may include an electrode assembly formed by winding a positive electrode and a negative electrode with a separator interposed therebetween, a case housing the electrode assembly, a cap plate sealing an opening of the case, and an electrode terminal passing through the cap plate to be electrically connected to the electrode assembly.

A negative electrode terminal of a secondary battery may include an electrode current collector made of copper and an electrode terminal made of aluminum. The electrode current collector made of copper may be connected to the electrode assembly inside the case, and the electrode terminal made of aluminum may be connected to the electrode current collector made of copper outside the case.

The electrode current collector made of copper and the electrode terminal made of aluminum may be coupled to each other by friction welding and riveting. As described above, in a case in which the negative electrode terminal is formed using dissimilar metals, numerous components may be required for coupling the dissimilar metals, and since the friction welding may be costly, the manufacturing cost may reflect this costliness.

Embodiments may provide a secondary battery, which may realize a simplified manufacturing process and cost reduction and may improve the reliability of electrode terminals formed of dissimilar metals coupled to each other.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly;
   a case accommodating the electrode assembly;
   a cap plate sealing the case;
   at least one electrode terminal including a terminal plate on the cap plate and a terminal pin passing through the cap plate and the terminal plate and electrically connected to the electrode assembly; and
   at least one groove on a top surface of the terminal plate;
   wherein:
   a top portion of the terminal pin is bent for insertion into the at least one groove, and
   the terminal plate includes a through-hole into which the top portion of the terminal pin is inserted to pass therethrough, a first groove along a peripheral portion of the through-hole on the top surface of the terminal plate, and a second groove on a bottom surface of the first groove and spaced apart from the through-hole.

2. The secondary battery as claimed in claim 1, wherein the through-hole ranges from the center of the bottom surface of the first groove to a bottom surface of the terminal plate.

3. The secondary battery as claimed in claim 1, wherein the second groove is perpendicular to the terminal plate.

4. The secondary battery as claimed in claim 1, wherein the second groove is parallel with the through-hole.

5. The secondary battery as claimed in claim 1, wherein the second groove is along the peripheral portion of the through-hole and is spaced apart from the through-hole.

6. The secondary battery as claimed in claim 1, wherein the top portion of the terminal pin is within the first groove and includes a first extension part bent and extending from a top portion of the through-hole to an interior surface of the first groove, and a second extension part bent and extending from an end of the first extension part and inserted into the second groove.

7. The secondary battery as claimed in claim 6, wherein:
   the first extension part is along the bottom surface of the first groove and is parallel with the terminal plate, and
   the second extension part is bent and extends from the end of the first extension part and is perpendicular to the terminal plate.

8. The secondary battery as claimed in claim 6, wherein:
   the first extension part is along the bottom surface of the first groove and is parallel with the terminal plate, and
   the second extension part is bent and extends from the end of the first extension part and is parallel with the terminal plate.

9. The secondary battery as claimed in claim 1, wherein the terminal pin and the terminal plate include dissimilar metals.

* * * * *